April 18, 1939. F. W. HUNYADY 2,155,089
BRAKE MECHANISM
Filed April 2, 1936 4 Sheets-Sheet 1
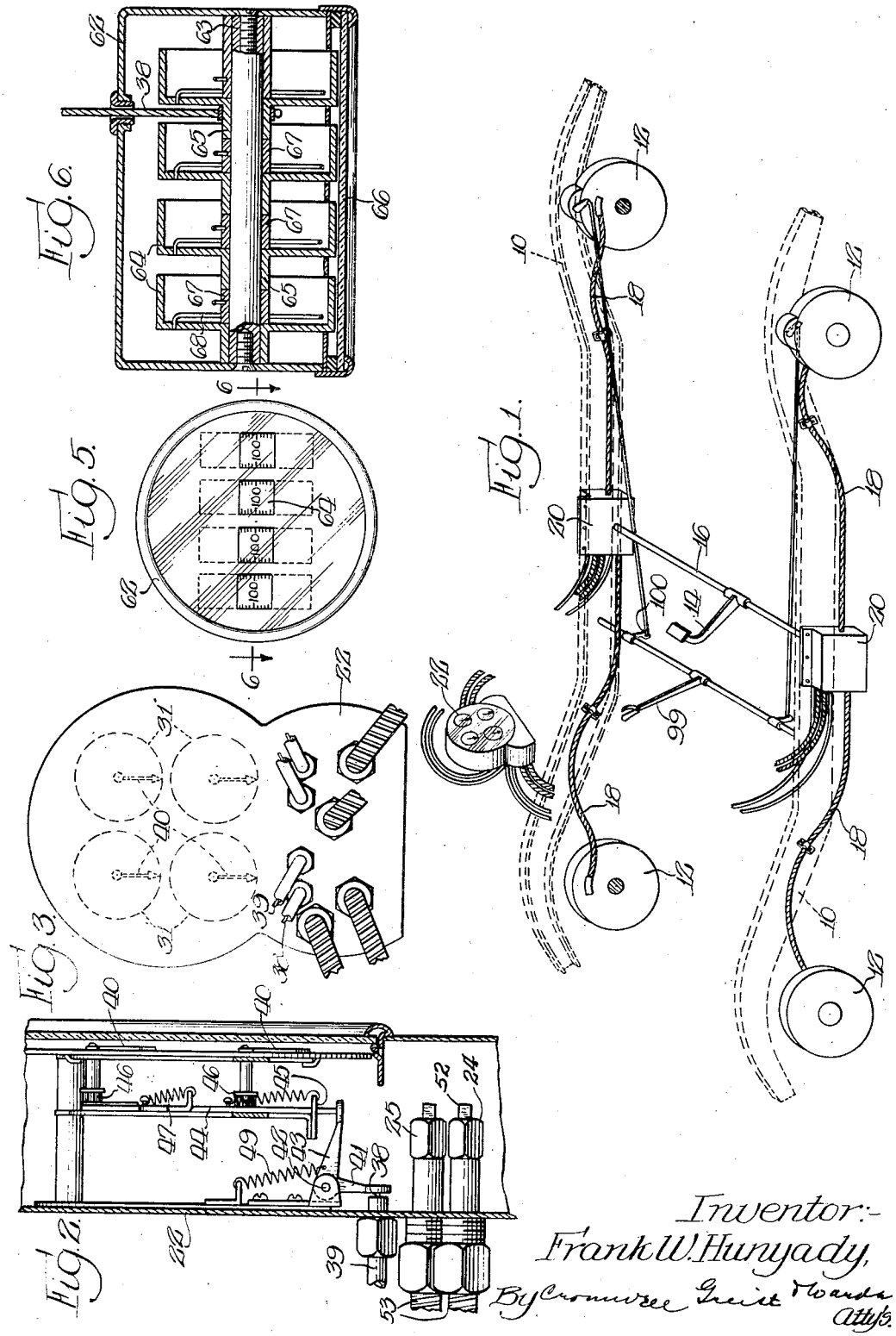
Inventor:-
Frank W. Hunyady,

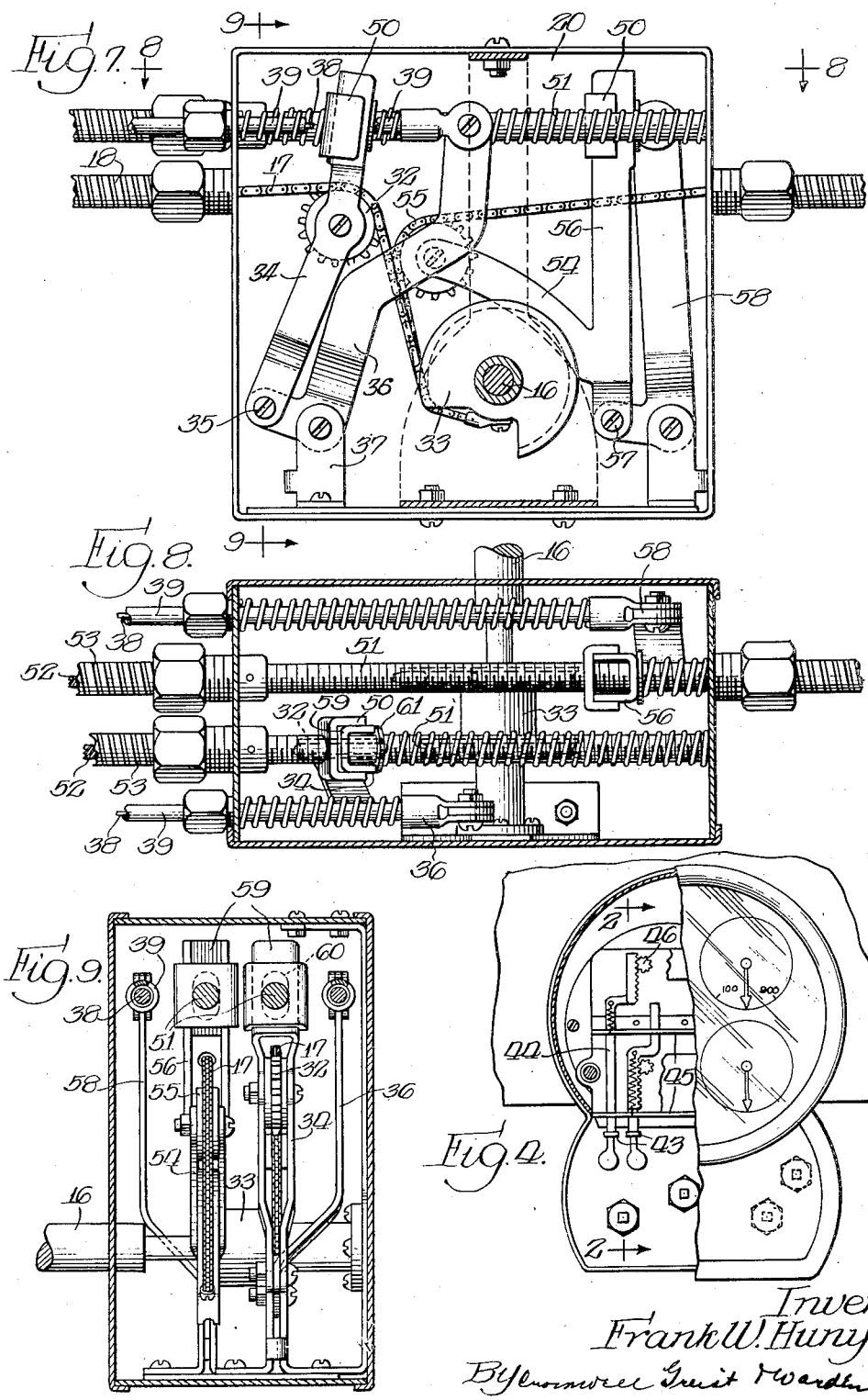

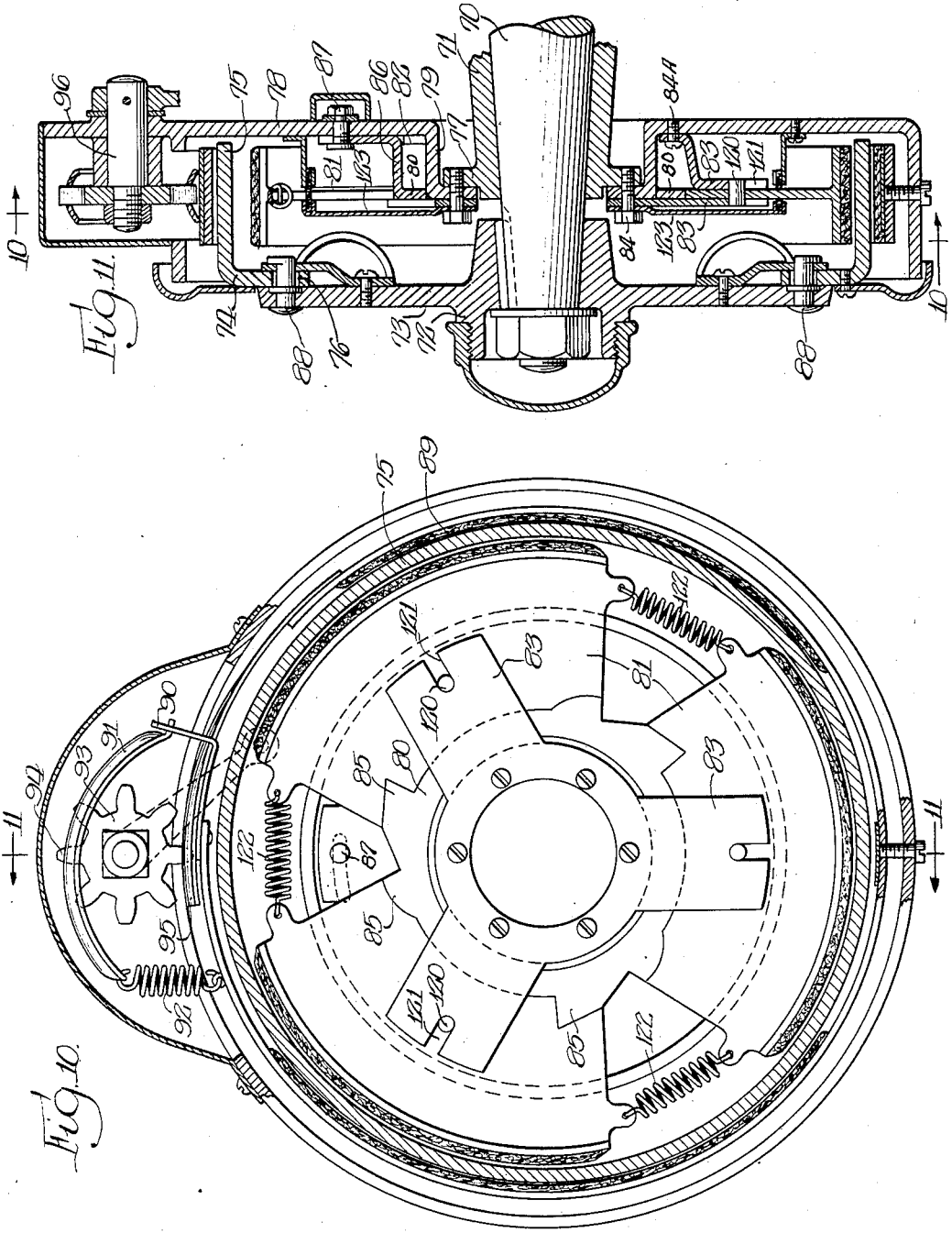

April 18, 1939.  F. W. HUNYADY  2,155,089
BRAKE MECHANISM
Filed April 2, 1936   4 Sheets-Sheet 4
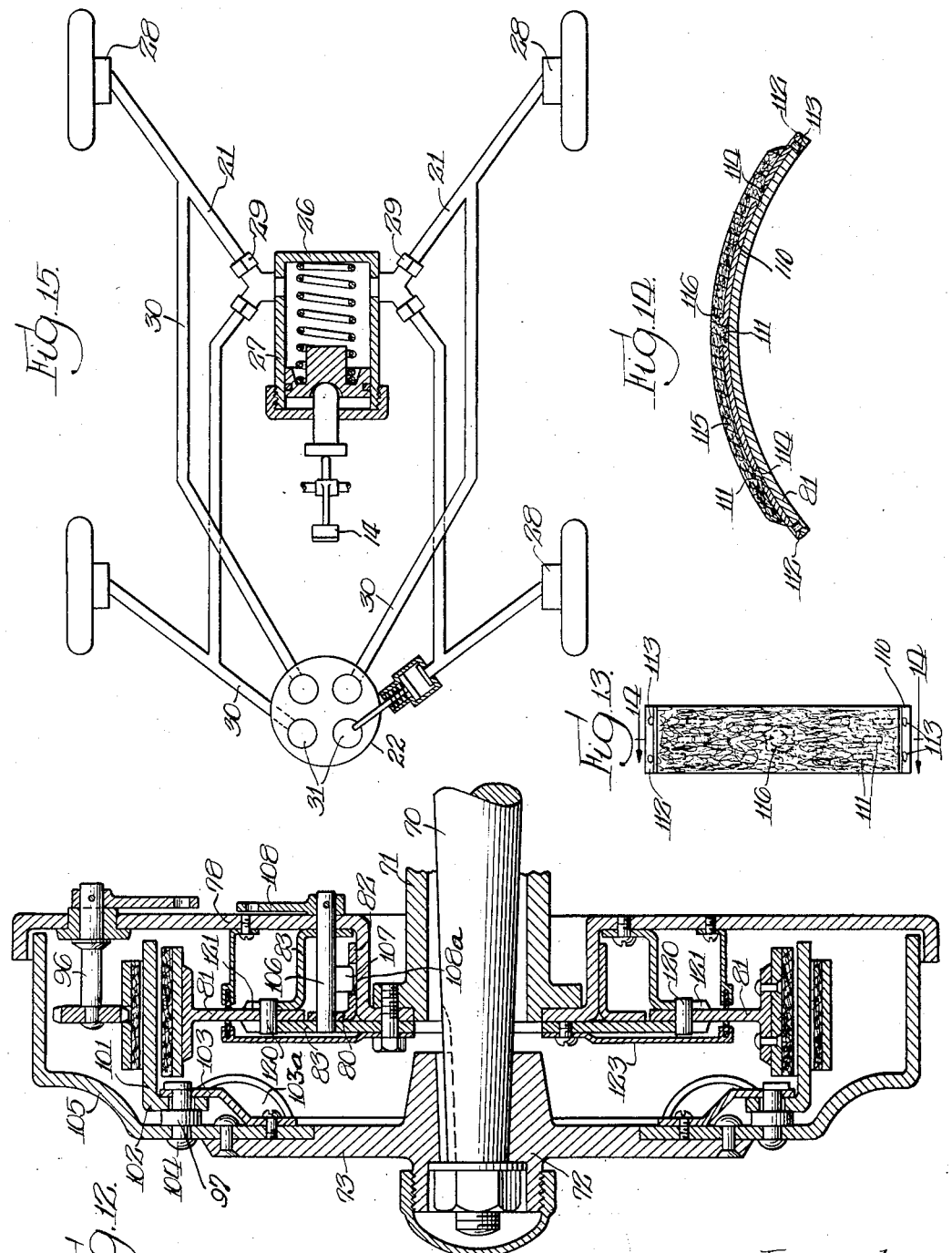
Inventor:-
Frank W. Hunyady, Patented Apr. 18, 1939

2,155,089

UNITED STATES PATENT OFFICE 2,155,089

BRAKE MECHANISM

Frank W. Hunyady, Chicago, Ill.

Application April 2, 1936, Serial No. 72,230

9 Claims. (Cl. 188—204)

The present invention relates to brake mechanism and more particularly to brake mechanism for indicating the relative adjustment of two or more brakes and adjusting means for the same.

In the use of brakes for automobiles it is necessary to apply a sufficient amount of braking power to stop or slow the high powered fast moving automobiles of the present day. No matter how much power is applied to the brakes, if they are not properly adjusted so that the pressure or pull upon the brake elements is substantially equalized among the two or four wheel brakes, there will not be an efficient braking of the wheels. If one wheel receives more pull or power than the other, the brake lining on that wheel will wear rapidly and the application of the brakes will tend to pull the automobile to the side where the most pressure is applied. If one wheel locks there is serious danger of accidents. One advantage of hydraulic brakes has been that this pressure upon all brakes is equalized when the mechanism is working properly and without leaks in the fluid lines.

In order to check the adjustment of both hydraulic and mechanical brakes today it is necessary to drive upon a specially constructed rack built for the purpose and to have the assistance of a mechanic in testing the relative adjustment of the brakes. If adjustment is necessary, the car must be placed on jacks, the wheel usually removed and proper adjustments made at each brake. This is an expensive and time-consuming undertaking and one not usually thought of by the motorist until his brakes begin to fail in efficiency noticeably or to pull him off the road upon application of braking power.

In the brake mechanisms of today there is also the possibility that the brake shoes are not forced against the braking surface or brake drum equally so that the whole surface of the brake lining is not pressed against the surface simultaneously. Unequal wear and consequent grabbing results from this condition. Moreover, where internal shoes are used for both the parking and foot brakes, the parking brake shoe is usually much smaller than the foot brake shoes, or only one shoe is used for this purpose while two or more are used for the foot brake. As the two brakes are normally used at different times or with different pressures at the same time, there is a tendency to distort the brake drum, making it oval or elongated. The drums themselves are seldom entirely round, and, with this unequal braking pressure applied, they are apt to become so out of line that proper brake efficiency is not attained and new drums must be supplied at no little expense.

This tendency to ovalize the drum is also noted in those instances when the brake shoes are supported against the drums from anchor pins mounted to dust covers or to arms. The pressures received from the circumferential and radial strains of contact with the drum are not directly supported but have a leverage action upon these off-center pins causing them to wear, twist and bend. Contact between the shoes and drums thus becomes unequal and braking efficiency is lessened.

Brake linings are another cause of wear and unequal braking pressure today. Customarily, they are riveted to the brake shoes by rivets that extend through the lining, are countersunk therein, and extend within the shoe proper. Though countersunk into the lining the rivets extend slightly above the shoe and the heads rest in the lining for holding it to the shoe. The lining cannot be used up entirely but must be renewed when it is worn down closely adjacent the rivet heads. If not then renewed, the rivet heads come in contact with the braking surface, scoring the same or are worn down so that they no longer hold the lining in place.

The present invention was made with these various deficiencies in mind and with a view toward remedying the same in mechanical and hydraulic brakes.

One object of the present invention is to provide a means of indicating the relative equalization of automobile brakes.

Another object of this invention is to provide a simple and inexpensive means for adjusting automobile brakes.

Another object of this invention is to permit a driver to know if his brakes are receiving equal pull or power at any time and to adjust them accordingly.

A further object of this invention is to permit the driver to learn if his brakes are substantially equalized and to adjust them if necessary from a convenient source such as the driver's seat and without jacking up the car or removing the wheels or brake drums.

A further object of this invention is to provide equal contact between shoes and drum at times when brakes are applied.

A yet further object of this invention is to provide a floating or equalizing brake surface so that the braking elements will have simultaneous and equal contact with the braking surface when the brakes are applied.

A yet further object of this invention is the application of the advantage of both internal and external brakes to the same brake mechanism.

Still another object of this invention is to provide a direct circumferential and direct mounting for the brake elements to receive the braking strains placed thereon.

Still another object of this invention is to provide an equal pressure contact between each part of the brake shoe lining and its braking surface.

Another object of my invention is to provide a lining that will wear equally and will not scratch or score the brake drum.

A further object of this invention is to provide a brake lining that may be used until substantially consumed.

A still further object of this invention is to provide a brake lining that is easily and cheaply manufactured and mounted in place upon its shoe.

Still other and further objects of my invention will be pointed out or indicated hereinafter or will be apparent to one skilled in the art upon an understanding of the invention or its employment in practice.

For aiding in a disclosure of the invention I show in the accompanying drawings forming a part of this specification certain arrangements of parts by reference to which the brake mechanism and its mounting are described. It is to be understood that this description and the drawings are presented for purposes of illustration only and are not to be construed so as to limit the scope of the appended claims unnecessarily.

In the drawings—

Fig. 1 is a schematic view in elevation of an automobile chassis having four wheel brakes and the indicating and adjusting mechanism attached thereto;

Fig. 2 is a sectional view through the brake pressure indicating meter;

Fig. 3 is a rear view of the brake pressure indicating meter;

Fig. 4 is a front view of the brake pressure indicating meter showing the same partially in section;

Fig. 5 is a front view of another type of brake equalizing indicator meter;

Fig. 6 is a sectional view on the line 6—6 of Fig. 5;

Fig. 7 is a side view of the brake equalizing and adjusting mechanism with the cover removed;

Fig. 8 is a plan view of the same taken on the line 8—8 of Fig. 7;

Fig. 9 is an end view of the same taken on the line 9—9 of Fig. 7;

Fig. 10 is a side view of a brake mechanism taken on the line 10—10 of Fig. 11 showing the outer casing broken away;

Fig. 11 is a sectional view through this brake mechanism on the line 11—11 of Fig. 10;

Fig. 12 is a sectional view through a modification of this brake mechanism;

Fig. 13 is a plan view of the new brake shoe lining;

Fig. 14 is a sectional view on the line 14—14 of Fig. 13; and

Fig. 15 is a schematic view of a four wheel automobile having hydraulic brake mechanism attached thereto and showing the brake pressure indicating meter as used therewith.

In presenting an embodiment of this invention as applied to automobiles, four wheel brakes have been chosen as representative of the type extensively used today and the invention is shown applied to both mechanical and hydraulic types of brakes. In most mechanical brakes today a foot lever is used to rotate a rod whereby operating mechanism such as a cable or chain is pushed or pulled in order to mechanically operate brake elements associated with the rotatable wheels for stopping or slowing the same.

In hydraulic brakes the same result is accomplished upon pressing a foot lever for causing the operating mechanism, in this case a fluid, to force these braking elements against a braking surface mounted upon a rotatable member such as a wheel. Where the operating mechanism is a fluid, normally a piston-like member is used to force the fluid to each of the brake mechanisms, causing the brake elements to be operated under this pressure. As fluid is used, an equal pressure is attained or is maintained at each of the brakes. Most of the lines through which this fluid runs are attached to the chassis but where the line leaves the chassis and runs to the brake, which is subjected to violent movement with reference to the chassis by means of its spring mounting, it is apt to become worn and be subjected to leakage causing a loss of braking efficiency in that specific brake and probably throughout the whole system.

Applicant therefore provides an indicating device in connection with the operating mechanism such as the cable in a mechanical brake or the fluid in an hydraulic brake so that the loss of pressure or pulling power between the brake lever and the braking mechanisms or elements may be known at once. In connection with this indicating device, applicant provides means for adjusting each of the operating mechanisms for the respective brake elements relative to each other so that the pull or pressure of the operating elements upon the brake elements may be equalized.

Both the indicating device and the means for adjusting the operating mechanisms may be centralized in one convenient place such as the dashboard of an automobile or the steering wheel so that the driver can know whether his brakes are receiving equal pressure or pull and may adjust the same from the driver's seat and without jacking up the car. Both the indicating device and the adjusting means may be placed in any other convenient position the car or its chassis.

As will be seen in Fig. 1, there is an automobile chassis 10 having brakes 12 mounted thereon. A foot lever 14 is mounted upon a rotatable rod 16 and cables in the housings 18 are so connected to the brake rod 16 and with the braking mechanisms within the brakes 12 that pressure upon the brake lever 14 will pull or push the cables within the housings 18 causing the brake mechanisms to operate, slowing or stopping a rotatable wheel mounted in connection with the brakes. A service box 20 is mounted on the chassis and contains mechanism that is so related with the brake lever and its rod 16, and with the cables within the housings 18 as to indicate the amount of pressure applied to each of these cables comprising the operating mechanism for the brake elements. An indicating device 22 preferably has separate dials leading from each of these operating mechanisms or cables whereby the relative pressure upon these cables may be shown. Within the service boxes 20 these cables may be adjusted for greater or less pull on the brake mechanism and the means for making the adjustment may be housed within the indicating device 22, as shown in Fig. 2, by the adjusting nuts 24 and 25.

With reference to Fig. 15 showing a schematic view of a hydraulic brake system, it will be seen that the indicating device 22 may be used therewith. As the loss in braking efficiency in the operating mechanism, which in this case is a fluid, is caused primarily by leaks in the fluid line, no adjustment for pressure in this type of brake has been attempted. It will be seen that there is a fluid storage chamber 26 and a piston 27 slidably engaging the walls of said chamber when the foot lever 14 is depressed so that fluid in the chamber is forced outwardly from the chamber through the lines 21 to the respective braking mechanisms 28. The place where these lines 21 leave the chassis for the individual brakes is schematically shown by the T joints 29. The lines are tapped between the junction of the chassis (represented by the T joints 29) and the brake mechanisms 28 and a separate line 30 is brought to a convenient place on the automobile, such as the dashboard, and terminates at the indicating device 22 in its respective dial 31. If a leak should occur in any of these lines 21 causing a lost pressure in that line, this fact will be indicated upon a dial 31 as the pressure indication for that line will not be relatively as high as the pressures in the other three lines. Whenever the driver depresses the foot lever 14 he can know definitely whether there is a leak in any specific brake line or, by a general loss of pressure indicated on the dials 31, he may know that his entire hydraulic system should be checked for general leaks.

Referring now to Figs. 1 to 4 inclusive and Figs. 7 to 9 inclusive, one embodiment of the indicating and adjusting mechanism for mechanical brakes will be described. The service box 20 is preferably mounted on the chassis in relation to the brake rod 16 and has within it the mechanism shown in Figs. 7 to 9 for cooperation with the operating means for the brake mechanisms. With specific reference to Fig. 7 it will be seen that there is an operating means such as a cable or chain 17 leading out from the casing 20 through the housing 18 to a brake 12, not shown in this figure. The chain 17 is brought into the casing 20 over a pulley or sprocket wheel 32 and fastened to the brake rod 16 by any suitable means. The brake rod 16 carries a cam-like member 33 which engages with the chain 17 upon rotation of the rod causing the chain to be pulled inwardly over the sprocket 32, operating the brake elements in the brake 12. The sprocket 32 is mounted upon an arm 34 which is hinged at 35 to a rocker arm 36 hingedly supported within the casing by the support element 37. This rocker arm 36 extends upwardly and is affixed to a wire cable 38 which extends out through the casing 20 and the housing 39 to the meter 22.

Upon rotation of the brake rod 16 the chain 17 is pulled inwardly over the sprocket 32 depressing the arm 34 and causing the rocker arm 36 to be moved forwardly, forcing the cable 38 through its housing 39 and into the meter 22, as will be seen in Fig. 2. Within the indicating device 22 there is a lever arrangement actuated by this cable 38 and mechanism cooperating therewith whereby a needle 40 on a dial 31 is actuated and caused to revolve according to the distance the lever 41 is pressed by the cable 38. One form of actuating mechanism may be that shown in Figs. 2 and 4 whereby the lever 41 is operated by the cable 38 and is hinged at 42 so that another arm 43 of the lever cooperates with a rack 44 held in the guideways 45 and operates a pinion 46 that is connected to the needle 40. Springs 47 return the rack and pinion to their operating position when the cable 38 is withdrawn by releasing the foot pedal 14. The spring 49 fixed to the casing of the indicating device 22 and attached to the lever 43 is a contact spring for holding this arm 43 into contact with its rack 44 but should not be of sufficient strength to operate the rack without the pressure of the cable 38.

Referring back to Fig. 7 we find that arm 34 carrying the sprocket 32 is continued upwardly and is slidably mounted within a guide or wing nut 50 which is screwed over a threaded bolt or spindle 51 rotatably mounted within the casing 20. One end of this rotatable bolt 51 is rigidly affixed to the end of a rotatable cable 52 which extends through the housing 53 to the indicating device 22, as shown in Fig. 2 of the drawings. Within the indicating device 22 the cable 52 is rigidly affixed to the adjusting nut 24. It will thus be understood that a rotation of the adjusting nut 24 will cause the cable 52 to rotate, thus rotating the threaded bolt or spindle 51, causing the nut 50 to travel backwardly and forwardly thereon. Movement of this nut 50 longitudinally of the spindle 51 causes movement of the arm 34 and the sprocket 32 so that the cable or chain 17 may be tightened or loosened at will. Upon tightening the cable 17 by moving the sprocket 32 away from the brake mechanism 12, added pressure is given to the brake mechanism 12 upon rotation of the brake rod 16.

If each of the four brakes of an automobile is fitted with a similar device, it is evident that the pressure as given to each of the brakes will be indicated upon the various dials 31. If some of the needles 40 indicate that the pressure applied to its brake is more or less than that given to the other brakes, the proper nut 24 or 25 may be turned, increasing or decreasing the tension upon its operating means 17 until the needle 40 for that brake comes into alignment with the needles of the other brakes. In this way the operator himself may know whether his brakes are all receiving the same pressure and may remedy the deficiency at once. Mechanical brakes fitted with this invention will thus have all of the advantages of an hydraulic brake without the disadvantage of having leaks in the system.

As also may be seen in Figs. 7, 8 and 9, another brake may be operated and its relative pressure indicated through the same service box 20. For this purpose there is shown in these drawings a yoke, one arm 54 of which carries a pulley or sprocket 55. The other arm 56 is held in slidable engagement with the usual nut 50 threaded upon its rotatable spindle 51. This yoke is hinged at 57 to a rocking arm 58 and is connected to a wire cable 38 running through the housing 39 to the indicating device 22 where it is connected by a lever, rack and pinion system to another of the dials 31. A threaded spindle 51 for the arm 56 is likewise connected to a rotatable cable 52 running through a housing 53 to the adjusting nut 25 within the indicating device 22, as may be seen in Fig. 2. By placing another service box 20 upon the other side of the chassis in connection with the operating means for the brakes on that side of the automobile, complete control of the four wheel brakes is attained.

As will be seen in Fig. 9 the arms 34 and 56 may each be made from two metal straps having a webbing 59 connecting the two straps at their upper ends. This webbing may be slotted at 60 to fit around the threaded spindle 51 and so mounted that it may slide up and down with relation thereto. A washer 61 (see Fig. 8) may be mounted in connection with the nut 50 for holding the arms 34 and 56 respectively in slidable engagement with the nut 50.

In Figs. 5 and 6 another indicating device is shown mounted within a casing 62. In this device a stationary journal 63 is mounted within the casing and a series of annular dials 64 are rotatably mounted thereover. As shown, each of these dials has a spacing collar 65 mounted between journal collars 67. Around these spacing collars is wrapped a cable 38 running from the service box 20 and connected to one of the rocking arms therein. Upon movement of this cable 38 the annular dial 64 will be rotated relative to the movement of this cable 38. One portion of the casing 62 is left open as at 66 so that the readings on the dials 64 may be seen therethrough. Stationary collars 67 from the journal 63 may carry spring means 68 for returning the dials to their neutral position when the cable 38 is returned upon release of the foot lever. The adjusting means for the brakes such as the nuts 24 and 25 shown in Fig. 2 may be mounted in connection with this meter.

In connection with this indicating and adjusting device for the operating means and brakes, there is shown, in Figs. 10, 11 and 12, a new brake which is recommended for use therewith. This brake mechanism may be used independently of the indicating and adjusting device and the latter in turn may be used with an other type of brake now on the market. This brake is so constructed, however, that equal pressure is applied to the braking surface and the stresses and strains received by means of the contact between the brake shoes and the braking surface are taken up by direct support so that wear upon the parts is greatly decreased. Only slight adjustments will be necessary as the linings on the brake shoes decrease in thickness. This wear will be even and constant for the linings in any one brake. In order to accomplish this result it is not necessary to use the ordinary brake drum with the braking surface upon its inner surface. Instead of making the brake shoes meet the deformities in the braking surfaces of a brake drum, the braking surface is so mounted in relation to the shoes that the deformities in the braking surface will fit themselves to the brake shoe surface. By doing this, grabbing of the braking surface is greatly reduced and there will be no chattering or vibration returned through the brake mechanism to the foot pedal. This may be done by forming the braking surface from an annular equalizing ring and the larger periphery of the brake drum itself may be so associated with the part upon which it is mounted that it will attain this equalizing feature. Moreover, the braking elements themselves, including the brake shoes, are mounted centrally with relation to the braking surface and directly supported thereagainst. For this purpose, the stationary member supporting the brake elements is brought centrally within the braking surface and the supporting elements for the shoes including the means for forcing the latter into contact with the braking surface are mounted around the stationary element or between the same and the shoes so that they have a direct radial thrust against the braking surface.

As will be seen in the drawings in Fig. 11, there is an axle 70 journaled within an axle housing 71 and keyed to the hub member 72 which supports a wheel, not shown, and the brake drum flange 73. An annular drum-like member 74 having the inwardly turned braking surface flange 75 is mounted to the brake drum flange 73 by bolts or rivets 86.

The axle housing 71 has an outwardly extending flange 77 to which is attached a dust cover 78. The dust cover 78 has an inwardly turned flange 79 for attachment to the axle housing flange 77 forming a seat for the brake element supporting means. As may be seen in reference to Figs. 10 and 11, this supporting means may comprise a plate 80 around and over which brake shoes 81 are directly mounted. Plate 80 may have a flange 82 forming a seat for the same upon the flange 79. The plate or annular ring 80 supports the brake shoes 81 and carries means for forcing the brake shoes into contact with the braking surface 75 by a radial outward movement of the plate 80. As shown in Fig. 10, mounting means may comprise a circumferential or peripheral edge of the ring 80 upon which the shoes are held by the guide or bracket members 83 which may be supported from the axial housing flange 77 by the fastening means 84 which also supports the dust cover 78 and the other braking elements and by the bolts 84a on the dust cover. Cam-like members 85 may be associated with the periphery of the plate 80 or the brake shoes 81, or both, so that a rotation of the plate 80 will cause the brake shoes 81 to be forced against the braking surface 75. Preferably a brake shoe 81 is supported against the braking surface from at least two supporting members 85, and others may be used if deemed advisable.

The brackets 83 mounted on the axle housing flange 77 and forming guides for the brake shoes 81 may have an additional function. In order to relieve the plate 80 from circumferential strains or twisting strains that may be as high as four hundred pounds per square inch, the brackets may be used for this purpose. Pins 120 on the brake shoes 81 engage the slot 121 of the brackets. The pins and brackets should be of sufficient strength to withstand these pressures. Of course the plate may serve this purpose if desired using the brackets for guide purposes only. But the preferred use is for the brackets to support the braking strains relieving the foot pressure applied to the brakes. The foot will have to support only the radial pressure of the shoes which is of little extent in these brakes. The shoes travel but a fraction of an inch in reaching a contact with the drum or braking surface.

Spring members 122 are mounted between each of the brake shoes 81 causing the shoes to reseat themselves upon the plate 80 when the foot pedal is released. By this construction the shoes 81 need not have any rigid or hinged mounting with the plate or brackets.

By using these cam-like members 85 the added weight and material of brake shoe supporting straps is done away with and the heavy cam-like lugs for spreading the usually hinged brake shoe is not necessary. As many or as few brake shoes may be mounted around the plate 80 as desired. For causing the rotation of the plate 80 when the cam-like mountings 85 are used, I provide an operating arm 86 which is rigidly attached to the plate or operating ring 80 and to the lever mechanism 87 extending through the wall of the dust cover 78 and adapted to be operated by one of the cables 17 running to the foot pedal 14 in the driver's seat.

An inner dust cover 123 may be mounted within the brake 12 around the moving parts thereof including the plate 124 and the brackets. When this is used, grease may be applied to these parts for a smoother operation of the brake.

The drum-like member 74 may be mounted for equalizing movement in relation to the hub member 73 and the brake shoes 81. For this purpose slots 76 are formed. When a wall of either drum-like member or the hub member 73 and the drum member and its braking surface 75 are so mounted, relative movement is permitted between the two. This movement should not be so great, nor permitted with such ease that the braking surface will rattle or be allowed to come in contact with the brake shoes when the braking mechanism is in a neutral position. It should permit a slight frictional movement between the two so that the brake shoes 81 themselves may center the braking surface under pressure and cause it to adjust or equalize itself in accordance with the amount of pressure placed against the brake surface 75 by shoes 81.

In relation to Figs. 10 and 11, it will also be seen that instead of using one of the brake shoes 81 as a parking or emergency brake, thus getting an unequal pressure against the braking surface when the foot brake alone is used, the outer surface of the flange 75 is surrounded by the brake band 89 for this purpose. At one point on the circumference this brake band is overlapped and the overlapping member 95 is slotted to permit an upwardly turned flange 90 of the overlapped member to extend upwardly therethrough and moved longitudinally with respect thereto. A perforated strap 91 is connected to the flange 90 and is held to the end of the brake band supporting the flange 90 by a spring member 92. The slotted end 95 of the brake band 89 is also perforated and a star wheel 93 having a plurality of protuberances 94 is mounted between the strap 91 and the perforated end 95 of the brake band. The protuberances 94 are caused to engage the perforations in both the strap 91 and the end member 95. Consequently, upon a clockwise rotation of the star wheel 93 the end member 95 and the flange 90 will be caused to move away from each other, tightening the brake band 89 to the braking surface 75. Upon a counterclockwise rotation of the star wheel 93, the contact between the brake band 89 and the braking surface 75 will be broken. The spring 92 will assist in breaking this contact. The rotation of the star wheel is procured by means of the spindle 96 mounted on the dust cover 78 and operated by a hand brake 99 with its rotating rod and lever arrangement 100, as may be seen in Fig. 1.

Fig. 12 is a modification of this device showing the usual axle housing 71 enclosing the axle 70 which is keyed to the hub member 72 and has the brake drum flange 73. Instead of the usual brake drum for the braking surface, the braking surface is obtained from an annular ring 101 having a mounting flange 102 in connection therewith. A plurality of brackets 103 are mounted upon the brake drum flange 73 and are attached to the mounting flange 102 of the braking surface 101. The bolt openings in the flange 102 are substantially larger than the bolts or other fastening means inserted therethrough for attaching the ring to the brackets 103. This permits an equalizing movement of the annular member 101 so that it may remove and adjust itself to meet the pressures placed aaginst it by the brake shoes 81. Preferably, the bolts 104 attaching the annular ring 101 to the bracket 103 also extend through the dust cover 105 for further rigidity. A spacing collar 97 may be mounted on the bolt 104 between the dust cover 105 and the flange 102 to prevent contact between the ring 101 and the cover 105. If the braking surface on the ring 101 becomes scratched or scored, it may be renewed very simply and inexpensively. A whole new brake drum is thus not necessary as it is in the present type of brake now on the market. The dust cover 105 may be made of very light and inexpensive material as it forms only the function of excluding dust and moisture from the braking mechanism.

Tremendous heat is produced within the modern brake by the frictional contact between the brake shoes and the braking surface. Some of the parts of the brakes are relatively cool compared to the parts adjacent the braking surface and there are stresses and strains in these metallic parts that subject the same to breakage, twisting or brake inefficiency. In order to cool the heated parts and cause a circulation of air within the brake structure each of the brackets 103 may carry a fan or air circulating member 103a which will distribute the heated air equally throughout the brake, and, by circulating the air, will tend to evaporate or dry up moisture that may have seeped in through the brake mechanism.

The supporting member for the brake shoes 81 and the operating mechanism for the same is shown in a different embodiment in Fig. 12. Instead of the operating arm of Fig. 11, a rotatable arm 106 is mounted in the dust cover 78 and to the innermost of the supporting members 83, the supporting element 80 carries a longitudinal slot so that the element 80 may move relative to the rod 106 and the supporting member 83. The rod 106 carries a tongue member 107 which fits with a locking groove 108 in the supporting flange portion 82 of the ring 80. The rod 106 is rotated by the lever 108 from the operating mechanism leading to the foot brake 14.

For most efficient and inexpensive operation of the brake a new type of brake shoe is recommended that uses no rivets and a maximum amount of brake lining may be worn away before renewal of the brake lining is needed. To accomplish this, a metal strap, cut and shaped to fit a brake shoe, is punched with openings and the edges of the openings are so formed that brake lining material deposited upon the convex side of a metal strap can flow into and around the holes and their edges forming an interlock therewith when the lining material is vulcanized to the metal strap. For this purpose the metal strap 110 may be placed upon a mandrel or other suitable supporting member, the brake lining material placed thereon to a suitable thickness filling the openings 111 and then vulcanized to the strap. Free ends 112 should be left at either end of the brake lining material so that the metal strap may be fastened to a brake shoe by rivets 113 countersunk within the strap 110.

In forming the openings 111 the edges thereof may be beveled as at 114 so that the brake lining material 115 may flow through the opening and interlock with the beveled edges. The edges of these openings may be also formed as a burr 116, the jagged edges of which can be forced down adjacent to the metal strap 110 so that a maximum amount of wearing surface will remain over and above it. The material of the brake lining 115 will interlock with the rough edges of the burr 116 holding the lining materially securely to the strap 110.

As will be seen by the drawings all parts of the brakes 12 and of the indicating and adjusting mechanism may be made of stampings and manufactured cheaply, rapidly and easily by punch press methods.

Various changes and modifications of this invention can be made without departing from the scope of the invention. All such obvious modifications are intended to be included in the appended claims.

I claim:

1. In a brake mechanism, the combination with a chassis having rotatable members mounted thereon, brake mechanisms for said rotatable members and a brake lever, of means for indicating the adjustment of said braking mechanisms with relation to each other, including an indicating device for each of said brake mechanisms mounted on said chassis, operating means associated with each of said brake mechanisms and so related to the same and to said brake lever as to operate said brake mechanisms upon movement of said lever, and means associated with each of said brake operating means to move its respective indicating device upon movement of said operating means and adjusting means adjacent said indicating device to regulate said operating means.

2. In a brake mechanism, the combination with a chassis having rotatable members mounted thereon, brake mechanisms for said rotatable members, and a brake lever, of means for adjusting said brake mechanisms with relation to each other including an indicating device for each of said brake mechanisms mounted on said chassis, brake operating means attached to said brake mechanisms and said lever and movable by the latter, means associated with each of said brake operating means to move its indicating means upon movement of its respective operating means, and adjusting means associated with said indicating means and with each of said operating means to adjust the same relative to the other operating means as shown by said indicating devices upon movement of said lever.

3. In a brake mechanism, including a rotatable member, braking means for retarding said rotatable member and a brake lever, a cable member attached to said brake lever and said braking means for operating the same, an adjustable movable arm associated with said cable member to tighten or loosen the same, a second arm connected to said first mentioned arm and movable by it according to movement of said cable, an indicating device operatively attached to said second mentioned arm for indicating any movement thereof, and means associated with said indicating device for adjusting said first mentioned arm.

4. In a brake mechanism including a rotatable member, braking means for retarding said rotatable member and a brake lever, brake operating means connected between said lever and said braking means, indicating means operatively connected to said operating means, said indicating means being operable by movement of said operating means, and adjusting means associated with said operating means for regulating said braking means.

5. In a brake mechanism including a plurality of rotatable members, separate braking means for retarding each of said rotatable members and a brake lever, separate brake operating means connected between said lever and each of said braking means and movable by said lever, an indicating means operatively connected to each of said operating means and operated by movement thereof, a centrally disposed indicating device for recording relative movements of said indicating means, and adjusting means operatively connected to each of said operating means for equalizing movement of said operating means to its respective braking means, said adjusting means being operable adjacent said indicating device.

6. In a brake mechanism, including a rotatable member, braking means for retarding said rotatable member and a brake lever, brake operating means connected between said brake lever and said braking means, an arm member associated with said operating means and movable therewith, an indicating device operatively attached to said arm member for indicating movement thereof, and adjusting means associated with said arm member for regulating the movement thereof.

7. The combination with a braking means having a brake mechanism, brake lever and brake operating means connecting said brake mechanism to said brake lever, of means for indicating and adjusting movement of said brake mechanism including an indicating means operable by said brake operating means upon movement of said lever and manual adjusting means associated with said indicating means for regulating the movement of said operating means.

8. The combination with a braking apparatus having a brake mechanism, a brake lever and yielding brake operating means connecting said brake mechanism to said lever, of means for indicating and adjusting movement of said brake mechanism including an arm associated with said yielding operating means and movable thereby, indicating means operable by movement of said arm, and adjusting means adjacent said indicating means for moving said arm to cause more or less movement of said brake mechanism by causing a more or less yielding of said operating means.

9. In a braking apparatus having a braking mechanism, a brake rod and a brake operating cable operably connecting said rod to said mechanism, an arm yieldably engaging said cable and movable thereby, indicating means operable by movement of said arm, and adjusting means connected to said arm for moving the same to tighten or loosen said cable.

FRANK W. HUNYADY.